United States Patent
Krengel et al.

(12) 
(10) Patent No.: US 7,651,221 B2
(45) Date of Patent: Jan. 26, 2010

(54) METHOD AND DEVICE FOR WORKING THE EDGES OF SPECTACLE LENSES

(75) Inventors: Klaus Krengel, Solingen (DE); Tobias Schildt, Düsseldorf (DE); Matthias Neff, Langenfeld (DE); Sebastian Beil, Düsseldorf (DE)

(73) Assignee: Buchmann Deutschland GmbH, Düsseldorf (DE)

( * ) Notice: Subject to any disclaimer, the term of this patent is extended or adjusted under 35 U.S.C. 154(b) by 73 days.

(21) Appl. No.: 12/092,079

(22) PCT Filed: Oct. 4, 2006

(86) PCT No.: PCT/EP2006/009595

§ 371 (c)(1),
(2), (4) Date: Apr. 30, 2008

(87) PCT Pub. No.: WO2007/042188

PCT Pub. Date: Apr. 19, 2007

(65) Prior Publication Data

US 2009/0225274 A1    Sep. 10, 2009

(30) Foreign Application Priority Data

Oct. 7, 2005    (DE) .................. 10 2005 048 436

(51) Int. Cl.
*G02C 7/02*    (2006.01)
(52) U.S. Cl. ...................... 351/177; 351/159
(58) Field of Classification Search ........ 351/159, 351/174, 177
See application file for complete search history.

(56) References Cited

U.S. PATENT DOCUMENTS

| | | | |
|---|---|---|---|
| 6,250,989 B1 | 6/2001 | Mizuno | |
| 6,334,681 B1* | 1/2002 | Perrott et al. | 351/159 |
| 6,813,536 B1 | 11/2004 | Gottschald | |
| 2002/0149739 A1* | 10/2002 | Perrott et al. | 351/159 |
| 2003/0157869 A1 | 8/2003 | Luderich et al. | |

FOREIGN PATENT DOCUMENTS

| | | |
|---|---|---|
| EP | 0379427 A2 | 7/1990 |
| EP | 4126313 A1 | 3/1992 |
| EP | 1366857 | 12/2003 |

* cited by examiner

*Primary Examiner*—Joseph Martinez
*Assistant Examiner*—James R Greece
(74) *Attorney, Agent, or Firm*—Gudrun E. Huckett

(57) ABSTRACT

For machining lenses by a CNC lens cutting machine, relevant data in regard to eyes, spectacle frame, and lenses are entered in the computer that compares the optical data of lenses and frame openings. When the lens is too small, it is moved by calculation relative to the shape of the frame edge until it is completely within the lens. The computer checks whether the carried-out movement is within given tolerances and, if not, the lenses are rejected; if the tolerances are met, the computer checks whether the carried-out movement of one lens requires movement of the other in order to meet the tolerances. If this is so, the computer calculates the minimum movement and checks whether this movement is within the tolerances and, if not, the lens pair is rejected. If the tolerances are met, the computer drives the machine for machining the shape of the spectacle lenses.

10 Claims, 2 Drawing Sheets

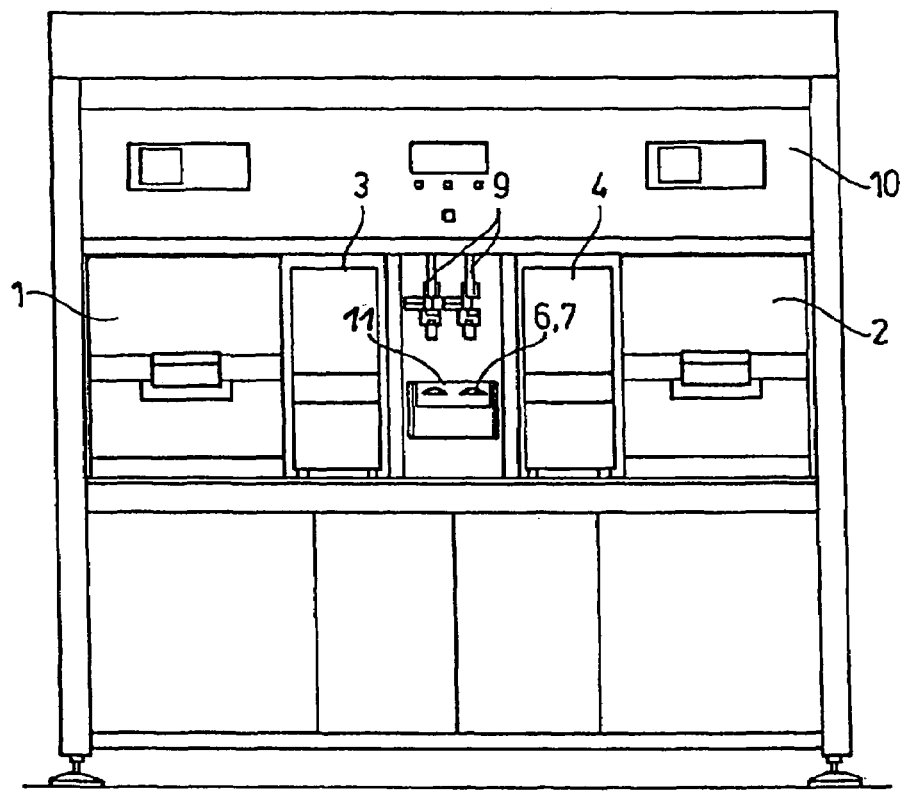
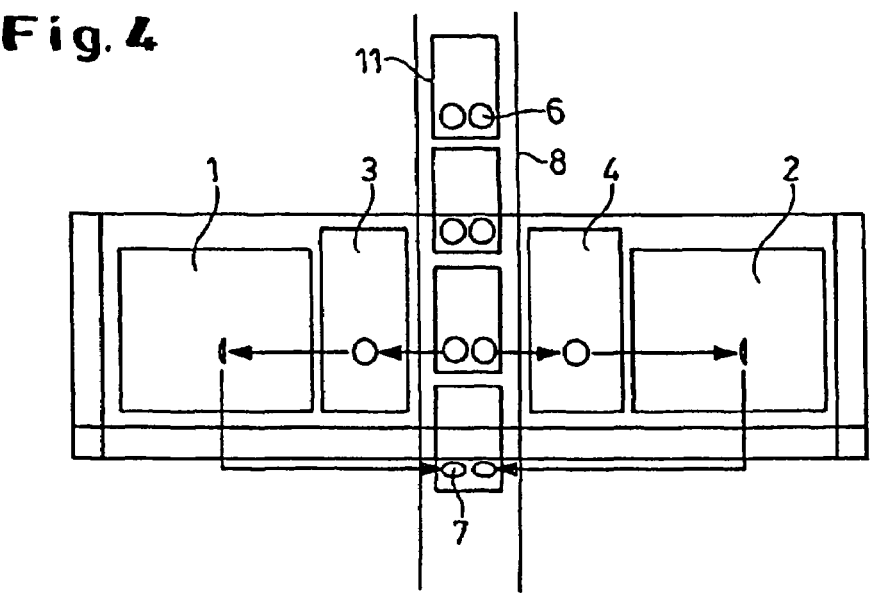

METHOD AND DEVICE FOR WORKING THE EDGES OF SPECTACLE LENSES

BACKGROUND OF THE INVENTION

The invention relates to a process for an apparatus for automatic matching of raw lenses, produced in accordance with order data, to a predetermined spectacle frame and for machining the edges to produce an accurate fit, by means of at least one CNC-controlled spectacle lens edge-machining machine, which has an input interface, having the following steps: the PD values for the left and right eyes are entered into a computer in accordance with the order data, the center height for the left and right eyes is entered in the computer in accordance with the order data, the optical values of the left and right eyes are entered in the computer in accordance with the order data and, if provided, the position of a reading section or of an intermediate corridor is entered in the computer, the raw lens diameter and the position of the optical center point and/or the raw lens dimensions are entered in the computer if the raw lenses are not round, and the position of the optical center point is entered in the computer with reference to the geometric center point for raw lenses which have been decentered in advance, are circular or are not circular, the shape data of the frame edges of the predetermined spectacle frame is entered in the computer, the shape data of the left and right spectacle lens openings and of the left and right raw lenses, which have been aligned in accordance with the PD values, the centering height of their respective optical center point, the axis position of a cylindrical component and/or the base position of a prismatic component of the optical effect, and, if given, with respect to the position of a reading section or of an intermediate corridor, is superimposed by calculation by the computer, the computer checks by calculation whether the size of the raw lenses is adequate for edge machining to match the predetermined spectacle frame.

Processes such as these and the use of the corresponding apparatuses are disclosed in DE 198 04 542 C2, EP 1 366 857 B1 and DE 100 13 648 A1.

The following principles for optical spectacle matching are described in the textbook: Dr. Enders, Die Optic des Auges und der Sehhilfen [The optics of the eye and vision aids], ISBN 3-9269-36-2, pages 4 to 69.

In order to machine the edges of spectacle lenses by means of CNC-controlled spectacle lens edge-machining machines, it is necessary to take account of the data relating to the individual and the data relating to the frame. The data relating to the individual includes the distance between the pupils of the eyes of the spectacle wearer (PD value) the optical values of the left and right spectacle lenses and, if given, details about the position of a reading section or of a varifocal corridor for varifocal spectacle lenses. The data relating to the frame includes the overall or the individual distance between the eyes (distance between centers), the height differences of the pupils of the left and right eyes (height centering), the corneal vertex distance, with respect to the selected spectacle frame, the angle of forward inclination of the spectacle frame and the frame bending (frame horizontal inclination angle). The data is referred to in a summarized form in the following text as the order data.

The required raw lens diameter can be determined from these values and in conjunction with the dimensions of a selected spectacle frame, and this need not necessarily be the same for the left and right spectacle lenses, although this is preferable.

For simple spectacle lenses with a low dioptric strength, in which the optical center point coincides with the geometric center point of the raw lens, it is generally possible to find a minimum raw lens diameter which is suitable for grinding the shape of the spectacle lenses intended for a predetermined spectacle frame, and this requires as little edge machining work as possible. In the case of positive lenses, this also results in the minimum center thickness. This is particularly true when the distances between the pupils of the eyes of the spectacle wearer and the spectacle frame center are essentially the same, there is very little height difference, or no height difference at all, between the left and right pupils, and when the vision strengths of the eyes are the same or are only slightly different. This is the ideal case, which also presupposes spectacle lenses with an ideal geometry.

If, for weight reasons, positive lenses with an optimized center thickness and therefore sharp edges and with a strong dioptric effect are intended to be fitted into large or broad fashionable spectacle frames, leading to unusual decentering values, in order to achieve spectacle lenses that are thin and light, it is frequently necessary to use raw lenses whose optical center point differs from the geometric center point, so-called predecentered raw lenses, which, in addition, may also not be round.

If these spectacle lenses also have different optical values for the left and right lenses, different, asymmetric axis positions of the cylindrical or prismatic component, different distances between the pupils and the spectacle frame center on the left and right, and also significant height differences between the left and right pupils, it is extremely difficult to define the correct raw lens diameter for the left and right spectacle lenses and to fit them in, taking into account the tolerances with respect to the vertical fusion width and the fusional divergence and convergence capability of the spectacle wearer.

Optical technicians working in the commercial field admittedly have the experience and the skill to find a compromise between the various, in some cases contradictory, requirements, but it is not always possible to avoid the fitting process failing or the lens breaking, or for good compatibility of the spectacles not to be achieved, thus resulting in the aim of automating the entire process of matching spectacle lenses produced in accordance with order data to a predetermined spectacle frame and the process of machining edges with an accurate fit, and to move this to large concerns in order in this way to avoid errors and to make the process of fitting the spectacle lenses more economical.

EP 0 379 427 A2 discloses a semi-automatic process and an apparatus for matching spectacle lenses produced in accordance with order data to a predetermined spectacle frame, and for machining the edges by means of a CNC-controlled spectacle lens edge-machining machine.

This process and the corresponding apparatus result in a raw lens which has been clamped in a spectacle lens holding shaft of a spectacle lens edge-machining machine being scanned on both sides by means of sensors along the circumference of the finished lens, corresponding to the predetermined spectacle frame. If these sensors go beyond an area of the circumference of the clamped-in raw lens, this means that the raw lens is too small in this area. The computer which controls the apparatus is programmed such that it can automatically calculate a movement of the finished lens contour such that it is located entirely within the circle of the raw lens. The magnitude of the computed movement is indicated, and the operator decides whether the movement magnitudes are satisfactory and, if this is the case, the machining process is initiated, based on the new values, by pressing a button. This process is carried out successively for a left and a right spectacle lens in each case, although the corrections which may be carried out are not related to one another in any way. In addition, this document does not contain any details on the criteria which the operator uses to assess whether the correction values are satisfactory, and the optical values of the spectacle lenses are ignored.

Furthermore, DE 41 26 313 A1 describes a CNC-controlled spectacle lens edge grinding machine which has a measurement device for measuring the distance between the geometric centers of the frame edges of a predetermined spectacle frame, an input device for entering a previously measured distance between pupils, a calculation device for calculation of any setting amount which occurs or is apparent from the difference between the distance between the pupils and the distance between the geometric centers of the spectacle lens openings of the spectacle frame, and a correction device for correction of the setting amount which occurs or is apparent on the basis of the curvature of the front surface of the spectacle lenses to be machined, the three-dimensional data relating to the spectacle frame, and the V-groove curve or curvature. This apparatus can be used for corrections for spectacle frames with large dimensions and with a large amount of curvature and angular discrepancy on a vertical plane. The measurements are either carried out both at the left and at the right edge of the frame of the spectacle frame, or they are carried out only on one frame edge, on the assumption that the two frame edges are congruent, in mirror-image form, in which case the measured data is inverted by calculation for the other frame edge.

The data for the left and right spectacle lenses are not related to one another, the optical values of the spectacle lenses are ignored, and there is no check of whether the raw lens diameter is sufficient to use this raw lens to produce the spectacle lenses required for the predetermined spectacle frame.

Checking whether the raw lens diameter is sufficiently large for a given shape of the finished lens taking into account the decentering values and if appropriate including corrections, is closely linked to the general requirements for matching the spectacle lenses to a spectacle frame chosen by the spectacle wearer.

The general aim is that the points at which the spectacle wearer looks through the spectacle lenses should coincide with the corresponding centering reference points, for example the optical center point, on the spectacle lenses. The corresponding geometric values are the distance between the center points and the centering height of the spectacle wearer. In addition to achieving optimum vision, a further aim is good compatibility with the spectacles. This is because undesirable prismatic effects occur if the centering reference points are not related. The brain can compensate for this within certain limits. In this case, incompatibilities can occur such as fatigue, headaches or visual disturbances in the form of double vision, if the forced compensation is not achieved by eye adjustment. The movement apparatus for the eyes can carry out specific movements which allow incorrect prismatic effects to be compensated for. For example, the fusional convergence capability is considerably greater than the fusional divergence capability, since the viewing axes of the eyes for long-distance vision must be very highly parallel, but never diverge, and do converge for short-range vision. A horizontal outward prism can therefore be compensated for by convergence of the vision axes, but compensation of an inward prism is very poor since the movement apparatus does not allow the vision axes to diverge outwards.

In the same way, vertical prisms in the same sense can be compensated for without any problem, since the movement apparatus of the eyes carries out the parallel movement of the vision axes upwards and downwards without any problems, but has difficulties in moving the two eyes in opposite directions.

The greater the dioptric effect of the spectacle lenses, the less is the permissible centering error, with a fixed prismatic tolerance limit. This results in the accuracy requirements for centering, which are greater the higher the induced, that is to say inadvertent, prismatic effect of the spectacle lenses. Vertical prismatic effects in opposite senses should be avoided, that is to say the centering reference points should be achieved as accurately as possible for the centering height. Centering error discrepancies in the case of negative lenses can be tolerated to a lesser extent outwards, and more inwards, while they can be tolerated less inwards, and more outwards, with positive lenses.

SUMMARY OF THE INVENTION

The invention is based on the object of proposing a process for and the use of an apparatus for carrying out the process, in which raw lenses produced in accordance with order data for the respective spectacle wearer can be automatically matched to a spectacle frame chosen by the spectacle wearer, including the essential criteria that are relevant for this purpose, in order to provide the spectacle wearer with spectacles which give him optimum vision and ensure good compatibility. The aim in this case is to be able to process as many of the raw lenses produced in accordance with order data as possible, in particular even raw lenses of just the right size, with a mechanical design that is as simple as possible and with computer program and storage capacity requirements that are as low as possible, to produce spectacles.

Against the background of these problems and the objective, a process is proposed for automatic matching of raw lenses, produced in accordance with order data, to a predetermined spectacle frame and for machining the edges to produce an accurate fit, by means of at least one CNC-controlled spectacle lens edge-machining machine, which has an input interface, having the following steps:

1. the PD values for the left and right eyes are entered into a computer in accordance with the order data,
2. the center height for the left and right eyes is entered in the computer in accordance with the order data,
3. the optical values of the left and right eyes are entered in the computer in accordance with the order data and, if provided, the position of a reading section or of an intermediate corridor is entered in the computer,
4. the raw lens diameter and the position of the optical center point and/or the raw lens dimensions are entered in the computer if the raw lenses are not round, and the position of the optical center point is entered in the computer with reference to the geometric center point for raw lenses which have been decentered in advance, are circular or are not circular,
5. the shape data of the frame edges of the predetermined spectacle frame is entered in the computer,
6. the shape data of the left and right spectacle lens openings and of the left and right raw lenses, which have been aligned in accordance with the PD values, the centering height of their respective optical center point, the axis position of a cylindrical component and/or the base position of a prismatic component of the optical effect, and, if given, with respect to the position of a reading section or of an intermediate corridor, is superimposed by calculation by the computer, 7. the computer checks by calculation whether the size of the raw lenses is adequate for edge machining to match the predetermined spectacle frame,
8. if necessary, the raw lens which is too small is moved by calculation with respect to the shape data of the respective frame edge until the shape data of the relevant frame edges is completely within the raw lens,
9. the computer checks by calculation whether the movement that has been carried out is within the predetermined tolerances, which are dependent on the prismatic effect as well as the optical center point taking into account the axis position of the main cuts of a cylindrical and/or prismatic component, and, if this is not the case, the pair of raw lenses are rejected or, if this is the case:
10. the computer checks by calculation whether the movement that has been carried out of one raw lens requires corresponding movement in the same sense of the other raw lens in order to comply with the predetermined tolerances with respect to the vertical fusion width and the fusional divergence and convergence capability, and, if this is the case,
11. the computer calculates the minimum required movement and checks by calculation whether the movement that has been carried out is within the predetermined tolerances, which are dependent on the prismatic effect as well as the optical center point, taking into account the axis position of the main cuts of a cylindrical and/or prismatic component and, if this is not the case, the pair of raw lenses are rejected or, if this is the case,
12. the spectacle lens-machining machine or machines is or are driven by the computer in order to machine the shape of the pair of spectacle lenses in accordance with the determined values.

In this context, the word entering is intended to mean both entering by means of a keyboard and entering by means of data transmission or data reading.

The invention is based on the idea that a low rejection or scrap rate and optimum vision as well as good compatibility for the relevant spectacle wearer can be achieved only when a pair of raw lenses which has been ordered from the spectacle lens manufacturer on the basis of their prescription values in conjunction with the shape data of a chosen spectacle frame, which pair of raw lenses may have optimized diameters and thicknesses, may be predecentered may also be non-round, are in each case jointly checked, with reference to each other, before machining the shape, with any required corrections being calculated such that they are related to one another, since it is the only way to make it possible to comply with the conditions, which were mentioned initially, some of which are contradictory and which, in addition, cannot all always be satisfied at the same time, within the predetermined tolerances.

When the optical values of the left and right raw lenses, the optical center point and, if given, the position of a reading section or of an intermediate corridor is/are recorded by means of an appropriate instrument and are transmitted to the computer, this results in automatic checking of the order data and automatic recording of the optical center point and, if given, of the position of a reading section or of an intermediate corridor, and the determined values are passed directly to the computer, which is then able to calculate the optimum axis position of the lens, from which the shape can best be ground out of the raw lens. In the case of purely spherical lenses, the orientation may be undefined, while in the case of cylindrical lenses, the shape can only be rotated through 180°, corresponding to the axis value.

In addition, the instrument can also be used to record the raw lens diameter and/or the raw lens dimensions and to transmit them or it to the computer, so that there is no need to enter these values manually.

Economic and fast machining of the edges of a pair of raw lenses can be achieved by using in each case one spectacle lens edge-machining machine for the machining of in each case one left and one right spectacle lens, as well as a respective instrument for recording the optical values, the optical center point and, if given, the position of a reading section or an intermediate corridor, the raw lens diameter and/or the raw lens dimensions in each case of a left and a right spectacle lens. In this case, it is particularly advantageous for the measurement and machining procedures for a pair of raw lenses to be carried out in parallel and at the same time.

Complete automation of spectacle lens edge machining can be achieved by using at least one handling device which picks up the pairs of raw lenses from a transport system, places them in the instrument or the instruments, removes them from the instrument or the instruments, and inserts them in the spectacle lens edge-machining machine or machines for machining if the pair of raw lenses are suitable for edge machining, or segregates rejected pairs of spectacle lenses and removes pairs of spectacle lenses whose shapes have been machined from the spectacle lens edge-machining machine or machines, and places them back on the transport system, with the predetermined tolerances to be taken into account with respect to the prismatic effect as well as the optical center point being stored in the computer, taking into account the axis position of the main cuts of a cylindrical and/or prismatic component, the vertical fusion width, the fusional divergence and convergence capability and the measurement of the raw lens diameter and/or the raw lens dimensions, as well as the movements of the handling device or of the handling devices on insertion into the spectacle lens edge-machining machine, and with this information being included in the calculations and checks.

This allows the machine tolerances of the instrument and of the handling device to be taken into account as well, in particular in such a way that the measurement tolerance of the centering point and/or of the raw lens diameter and/or of the raw lens dimensions and/or the handling tolerance are/is subtracted from the determined raw lens diameter or its dimensions in the computer, or are/is added to the radial values of the finished lens data, when the superimposition by calculation is carried out.

A block or sucker with the centering calculated for the respective raw lens is in each case preferably attached to the left and to the right raw lens, in which case the instrument or instruments can be used provided that it or they is or are equipped with suitable devices.

It is likewise possible to include the centering data calculated for the left and right raw lenses directly in the edge machining data, by calculation. In this case, either the left and the right raw lenses can be provided with a block or sucker at the optical center point or the left and right raw lenses are inserted into the spectacle lens edge-machining machine accurately in position with respect to the optical center point, but without using a block or sucker, by means of the handling device, where they are machined in accordance with the edge machining data.

BRIEF DESCRIPTION OF THE DRAWINGS

The invention will be explained in more detail in the following text with reference to two exemplary embodiments which are illustrated in the drawing and are suitable for carrying out the process according to the invention. In the drawing:

FIG. 3 shows a schematic front view of a second embodiment of the installation, and FIG. 4 shows a schematic plan view of the installation shown in FIG. 3.

DESCRIPTION OF PREFERRED EMBODIMENTS

Figure 1:
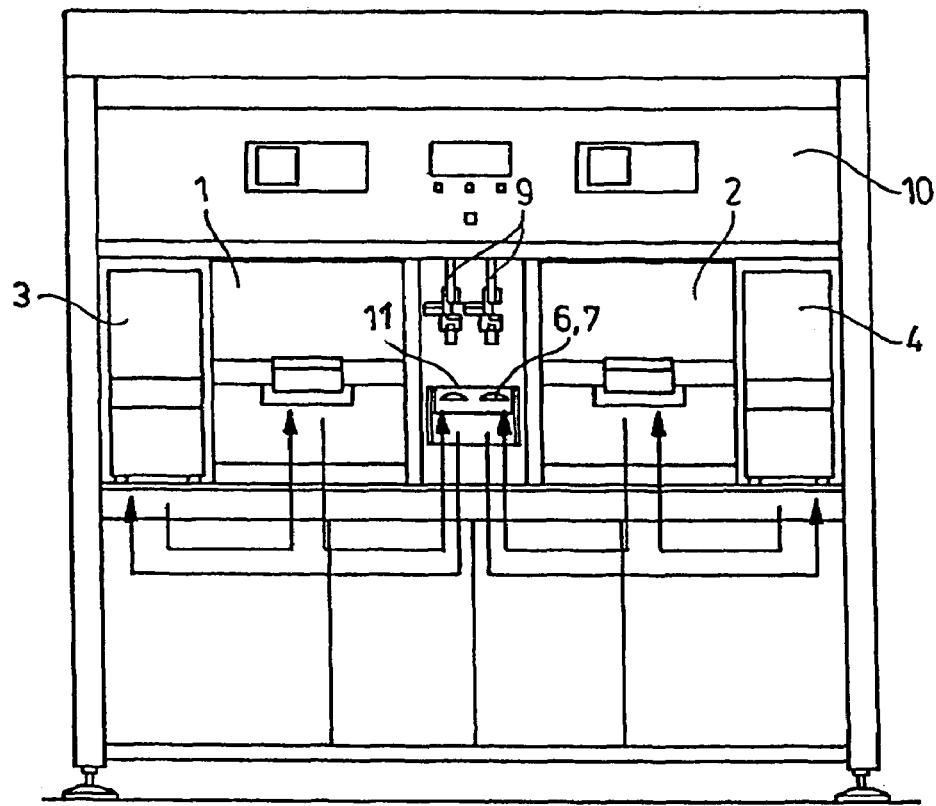
FIG. 1 shows a schematic front view of the installation.

In the exemplary embodiment illustrated in FIG. 1, a spectacle lens edge-machining machine 1 for a left spectacle lens and a spectacle lens edge-machining machine 2 for a right spectacle lens are arranged opposite one another, and their spectacle lens holding shafts run coaxially with respect to one another.

In the spectacle lens edge-machining machines 1, 2, spectacle lens holding shafts are arranged in a manner which is not illustrated in detail in respective machining chambers in the spectacle lens edge-machining machines 1 and 2, and each of these machining chambers can be closed by a folding cover.

Diamond grinding disks, which are not illustrated, are used to machine spectacle lenses composed of silicate glass, with cooling liquid being supplied to the grinding gap between a raw lens 6, which is to be machined and is clamped in between the half-shafts, and a grinding disk which is not illustrated.

High-speed milling cutters or else grinding disks are used to machine plastic lenses, with the machining likewise being carried out with a coolant being supplied, or dry, depending on the type of plastic.

A feed device in the form of a conveyor belt 8 is arranged between the spectacle lens edge-machining machines 1, 2 and, in the illustrated exemplary embodiment, its transport direction runs at right angles to the axes of a spectacle lens holding shaft and is used for transporting pairs of raw lenses 6 arranged in transport boxes to the machines, and for transporting completed pairs of lenses 7 and segregated pairs of raw lenses away.

The conveyor belt 8 transports in each case one transport box 11 to the machines, and the transport box 11 is stopped in the area of a pair of handling devices 9, which can be moved on a gantry-like guide 10. Here, a pair of raw lenses 6 are picked up by the handling device 9 and are inserted into apparatuses 3, 4 for determination of the diameter and/or of the dimensions, the optical values, the optical center point, the axis position of a cylindrical or prismatic ground section, the position of a reading section and/or the position of the intermediate corridor of a raw lens 6 in the form of a varifocal lens. The values received by the apparatuses 3, 4 are transmitted as a data set via a data link 5 to the spectacle lens edge-machining machines 1, 2. These spectacle lens edge-machining machines 1, 2 are CNC-controlled, have a data link between them, and are able to take account of the data transmitted from the apparatuses 3, 4 in the machining of the edges of the raw lenses 6.

The computers for the spectacle lens edge-machining machines 1, 2 in which the PD values associated with the respective pair of raw lenses and the centering height for the left and right eyes as well as the shape data of the frame edges of the predetermined spectacle frame are already available first of all superimpose by calculation the shape data of the left and right frame edges and of the left and right raw lenses, aligned in accordance with the PD values, the centering height of its respective optical center point, the axis position of the cylindrical and/or prismatic component of the optical effect and, if given, with regard to the position of a reading section or of an intermediate corridor, with a check to determine whether the size of the raw lenses is adequate for edge machining in accordance with the predetermined spectacle frame. If the size of the raw lenses is sufficient for the edge machining, an appropriate signal is passed to the handling devices 9.

If the size of one or other of or both raw lenses is not sufficient, the computers carry out a movement, by calculation, of the raw lens that is too small until the relevant spectacle lens opening is completely within the raw lens, and a check is then carried out to determine whether the movement that has been carried out is within the predetermined tolerances, which are dependent on the prismatic effect as well as the optical center point, taking into account the axis position of the main cuts of a cylindrical and/or prismatic component. If this is not the case for only one of the raw lenses, the relevant pair of raw lenses are rejected and segregated. If the movement is within the predetermined tolerances, the computers carry out a further check by calculation to determine whether the movement of one raw lens that has been carried out requires a corresponding movement in the same sense of the other raw lens in order to comply with the predetermined tolerances relating to the vertical fusion width and the fusional divergence and convergence capability. If this is not the case, the pair of raw lenses is ready for edge machining. However, if the second raw lens has to be moved in the same sense, the minimum required movement is calculated, and a check is carried out by calculation to determine whether the movement that has been carried out is within the predetermined tolerances, which are dependent on the prismatic effect as well as the optical center point, taking into account the axis position of the main cuts of a cylindrical and/or prismatic component. If this movement is not within the predetermined tolerances, the relevant pair of raw lenses must be rejected and segregated. If this movement is within the predetermined tolerances, the relevant pair of spectacle lenses are satisfactory and are ready for edge machining, which is done by using the computer to drive the spectacle lens-machining machines in order to machine the shape of the pair of spectacle lenses in accordance with the determined values.

If a pair of raw lenses has been rejected and must be segregated, an appropriate signal is passed to the handling devices 9, so that they do not insert the pairs of raw lenses into the spectacle lens edge-machining machine 1, 2, but place them back in the respective transport boxes 11, without machining them.

The predetermined tolerances to be taken into account with respect to the prismatic effect as well as the optical center point and taking account of the axis position of the main cuts of a cylindrical and/or prismatic component, the vertical fusion width, the fusional divergence and convergence capability, the measurement of the raw lens diameter and/or the raw lens dimensions as well as the movements of the handling devices 9 during insertion into the spectacle lens edge grinding machines 1, 2 are stored in the computers and are included in the calculations and checks. In this case, the measurement tolerance of the optical center point, of the raw lens diameter and/or of the raw lens dimensions as well as the handling tolerance are taken into account by subtracting them from the determined raw lens diameter or its dimensions in the computer or by adding them to the radial values of the finished lens shapes when the superimposition by calculation is being carried out.

After the optical values etc. have been received in the apparatuses 3, 4, the handling devices 9 once again grip the raw lenses and insert them into the spectacle lens edge-machining machines 1, 2, where their shapes are machined to form a left and a right spectacle lens 7, respectively.

After completion of the machining, the finished lenses 7 are removed by means of the pair of handling devices 9 from the spectacle lens holding shafts of the spectacle lens edge-machining machines 1, 2 and are placed back in the transport boxes 11. The conveyor belt 8 is then set in motion again, and transports the transport box 11 with the finished lenses 7 to a further processing area, where the finished lenses are inserted into the associated spectacle frame.

In the illustrated exemplary embodiment, the handling devices 9 have suckers which are not illustrated in detail but by means of which they grip the raw lenses 6, place them between the spectacle lens holding shafts, and allow them to be firmly clamped there.

In this case, there is no need for the raw lenses 6 to be aligned in an accurate position and inserted at an accurate angle into the spectacle lens holding shafts, and the handling devices 9 just have to carry out simple, repeated movements, since the data which is received in the apparatuses 3, 4 in order to define the optical values etc. and is transmitted to the spectacle lens-machining machines 1, 2 includes information about the position of the raw lenses 6, and this information is taken into account by calculation in the machining of the spectacle lenses.

It is also possible to provide each of the apparatuses 3, 4 for definition of the optical values with a device for placing a block or sucker in the correct position and at the correct angle on the raw lens as a function of the received data relating to the raw lenses. In this case, the handling devices 9 pick up the raw lenses 6 on the blocks or suckers attached to them in the apparatuses 3, 4 in order to define the optical values etc., and place them with their axes accurately aligned in the spectacle lens holding shafts. Since the normal blocks or suckers have holders which are complementary to those of the spectacle lens holding shafts, it is sufficient for the spectacle lens holding shafts to rotate slightly while being moved together in order to clamp in the raw lenses 6 that have been provided with blocks or suckers, in order to latch into the holders, in this way also fixing the angular position of the raw lenses 6 with respect to the spectacle lens holding shafts.

According to a further embodiment, a data link can be provided between the apparatuses 3, 4 for definition of the optical values etc. and the handling devices 9. The data relating to the raw lenses 6 which is received by the apparatuses 3, 4 for definition of the optical values etc. is then taken into account by calculation in the handling devices 9, in order to insert the raw lenses 6 accurately in position and at an accurate angle into the machining machines 1, 2.

Figure 2:
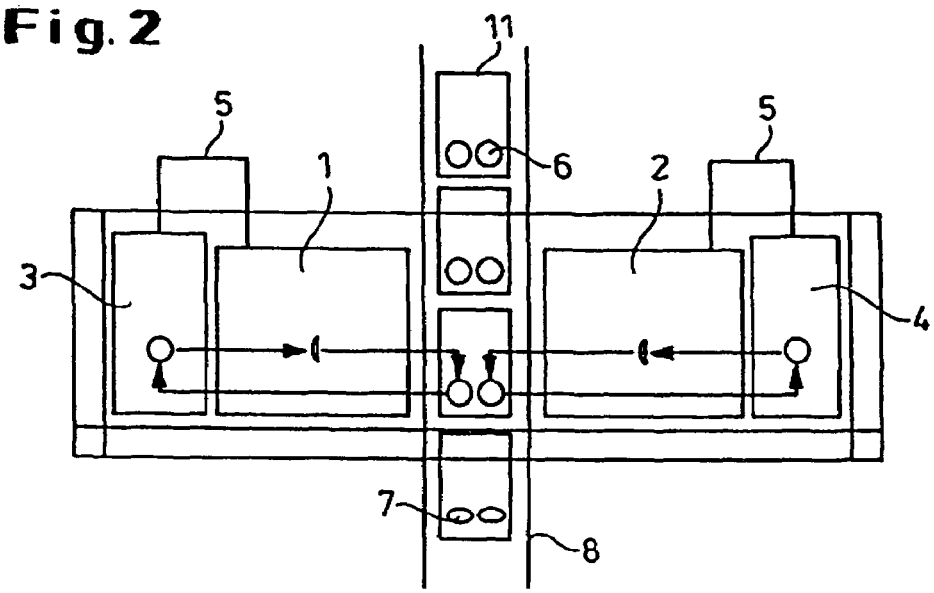
FIG. 2 shows a schematic plan view of the installation shown in FIG. 1.

In the embodiment illustrated in FIGS. 3 and 4, the apparatuses 3, 4 for definition of the optical values etc. are arranged adjacent to the feed device 8, while in the embodiment shown in FIGS. 1 and 2, the machining machines 1, 2 are arranged adjacent to the feed device 8. This does not change the fundamental procedure.

In both exemplary embodiments, the axes of the spectacle lens holding shafts of the two processing machines 1, 2 run coaxially with respect to one another, and the machining machines 1, 2 as well as the apparatuses 3, 4 for definition of the optical values etc. are arranged essentially aligned and at right angles to the movement direction of the feed device 8. However, it is also possible to arrange the machining machine 1 and the apparatus 3 for definition of the optical values etc. as well as the machining machine 2 and the apparatus 4 for definition of the optical values etc. rotated through 90° with respect to the feed device 8, so that the axes of the spectacle lens holding shafts in the machining machines 1, 2 run parallel to the movement direction of the feed device 8.

The illustrated exemplary embodiment shows a double-machine arrangement for simultaneously checking and machining left and right spectacle lenses. However, the invention is not restricted to this but also covers embodiments with only one machining machine for machining the shape of spectacle lenses, one handling device and one apparatus for definition of the diameter and/or of the dimensions, of the optical values, of the optical center point, of the axis position of a cylindrical or prismatic grind, the position of a reading section and/or the position of the intermediate corridor of a spectacle lens in the form of a varifocal lens, with this apparatus either being connected to the machining machine via a data line or being provided with a device for placing a block or sucker in the correct position and at the correct angle on the raw lens as a function of the received data relating to the raw lens, so that the handling device can be a simple "pick and place robot". In this case, the checks according to the invention of the left and right raw lenses and the subsequent edge machining must be carried out successively.

The invention claimed is:

1. A process for automatic matching of raw lenses (6), produced in accordance with order data, to a predetermined spectacle frame and for machining the edges to produce an accurate fit, by means of at least one CNC-controlled spectacle lens edge-machining machine (1), which has an input interface, having the following steps:

1.1 the PD values for the left and right eyes are entered into a computer in accordance with the order data, 1.2 the center height for the left and right eyes is entered in the computer in accordance with the order data, 1.3 the optical values of the left and right eyes are entered in the computer in accordance with the order data and, if provided, the position of a reading section or of an intermediate corridor is entered in the computer, 1.4 the raw lens diameter and the position of the optical center point and/or the raw lens dimensions are entered in the computer if the raw lenses (6) are not round, and the position of the optical center point is entered in the computer with reference to the geometric center point for raw lenses (6) which have been decentered in advance, are circular or are not circular, 1.5 the shape data of the frame edges of the predetermined spectacle frame is entered in the computer, 1.6 the shape data of the left and right spectacle lens openings and of the left and right raw lenses (6), which have been aligned in accordance with the PD values, the centering height of their respective optical center point, the axis position of a cylindrical component and/or the base position of a prismatic component of the optical effect, and, if given, with respect to the position of a reading section or of an intermediate corridor, is superimposed by calculation by the computer, 1.7 the computer checks by calculation whether the size of the raw lenses (6) is adequate for edge machining to match the predetermined spectacle frame, 1.8 if necessary, the raw lens (6) which is too small is moved by calculation with respect to the shape data of the respective frame edge until the shape data of the relevant frame edge is completely within the raw lens, 1.9 the computer checks by calculation whether the movement that has been carried out is within the predetermined tolerances, which are dependent on the prismatic effect as well as the optical center point taking into account the axis position of the main cuts of a cylindrical and/or prismatic component, and, if this is not the case, the pair of raw lenses (6) are rejected or, if this is the case:

1.10 the computer checks by calculation whether the movement that has been carried out of one raw lens (6) requires corresponding movement in the same sense of the other raw lens (6) in order to comply with the predetermined tolerances with respect to the vertical fusion width and the fusional divergence and convergence capability, and, if this is the case, 1.11 the computer calculates the minimum required movement and checks by calculation whether the movement that has been carried out is within the predetermined tolerances, which are dependent on the prismatic effect as well as the optical center point, taking into account the axis position of the main cuts of a cylindrical and/or prismatic component and, if this is not the case, the pair of raw lenses (6) are rejected or, if this is the case, 1.12 the spectacle lens-machining machine or machines (1) is or are driven by the computer in order to machine the shape of the pair of spectacle lenses (7) in accordance with the determined values.

2. The process as claimed in claim 1, in which the optical values of the left and right raw lenses (6), the optical center point and, if given, the position of a reading section or of an intermediate corridor are recorded by means of at least one appropriate instrument (3, 4), and are transmitted to the computer.

3. The process as claimed in claim 1, in which the raw lens diameter and/or the raw lens dimensions are/is recorded by means of at least one appropriate instrument (3, 4), and are/is transmitted to the computer.

4. The process as claimed in claim 1, in which the optical values, the optical center point and, if given, the position of a reading section or of an intermediate corridor, the raw lens diameter and/or the raw lens dimensions of the left and right raw lenses are/is recorded by means of at least one appropriate instrument (3, 4), and are/is transmitted to the computer.

5. The process as claimed in claim 4, in which in each case one spectacle lens edge-machining machine (1) is used for simultaneous parallel machining, or machining with a time offset, of in each case one left and one right spectacle lens (7), and in each case one instrument (3, 4) is used for simultaneous parallel recording, or recording with a time offset, of the optical values, of the optical center point and, if given, the position of a reading section or of an intermediate corridor, of the raw lens diameter and/or of the raw lens dimensions of in each case one left and one right spectacle lens (7).

6. The process as claimed in claim 4, in which at least one handling device (9) is used, which picks up the pairs of raw lenses (6) from a transport system (8, 11), places them in the instrument or the instruments (3, 4), removes them from the instrument or the instruments (3, 4) and inserts them in the spectacle lens edge-machining machine or machines (1) for machining if they are suitable, or segregates rejected pairs of spectacle lenses (6) and removes pairs of spectacle lenses (7) whose shapes have been machined from the spectacle lens edge-machining machine or machines (1) and places them back on the transport system (8, 11), with the predetermined tolerances to be taken into account with respect to the prismatic effect as well as the optical center point being stored in the computer, taking into account the axis position of the main cuts of a cylindrical and/or prismatic component, the vertical fusion width, the fusional divergence and convergence capability and the measurement of the raw lens diameter and/or the raw lens dimensions, as well as the movements of the handling device or of the handling devices (3, 4) on insertion into the spectacle lens edge-machining machine (1), and with this information being included in the calculations and checks.

7. The process as claimed in claim 6, in which the measurement tolerance of the optical center point and/or of the raw lens diameter and/or of the raw lens dimensions and/or the handling tolerance are/is taken into account in such a manner that they or it is/are subtracted in the computer from the determined raw lens diameter or its dimensions, or it or they is/are added to the radial values of the finished lens shapes, when the calculation superposition is carried out.

8. The process as claimed in claim 1, in which a block or sucker with the centering calculated for the respective raw lens (6) is in each case attached to the left and to the right raw lens (6).

9. The process as claimed in claim 2, in which the instrument or instruments (3, 4) is or are used to attach in each case one block or sucker to the respective raw lens (6), with the centering calculated for this purpose.

10. The process as claimed in claim 2, in which the centering data calculated for the left and right raw lenses (6) is included by calculation in the edge machining data.

* * * * *